S. KETHLEDGE.
Lumber-Measure.
No. 208,101. Patented Sept. 17, 1878.
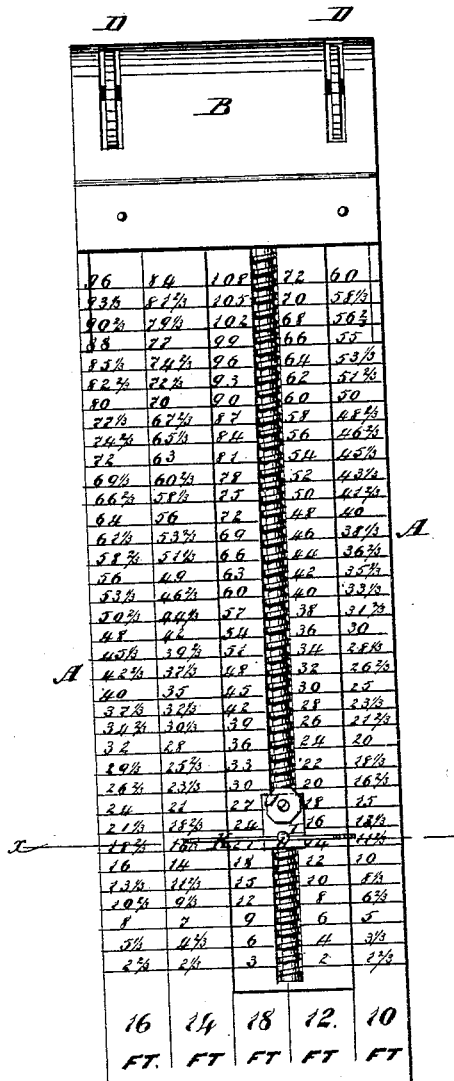
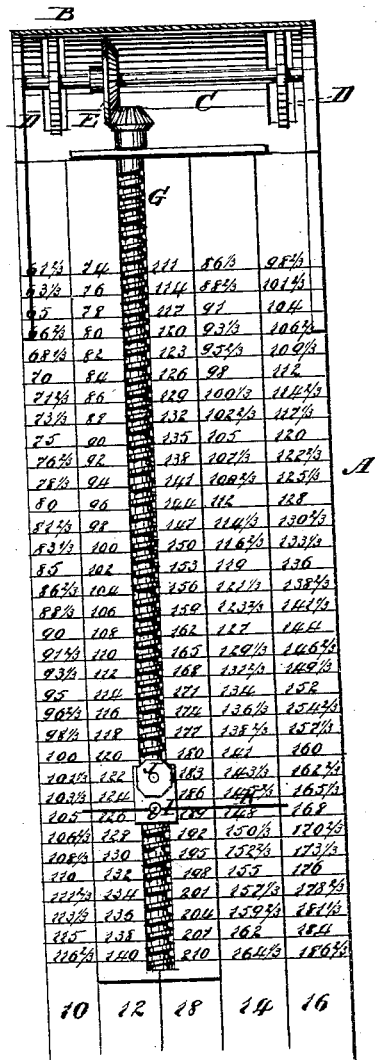
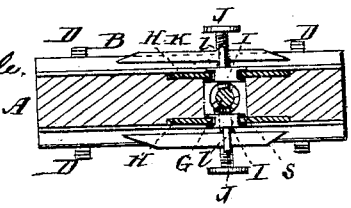
WITNESSES:
Francis McArdle
C. Sedgwick
INVENTOR:
S. Kethledge
BY Munn & Co
ATTORNEYS.

UNITED STATES PATENT OFFICE.

SETH KETHLEDGE, OF CENTRE POINT, IOWA.

IMPROVEMENT IN LUMBER-MEASURES.

Specification forming part of Letters Patent No. 208,101, dated September 17, 1878; application filed June 11, 1878.

*To all whom it may concern:*

Be it known that I, SETH KETHLEDGE, of Centre Point, in the county of Linn and State of Iowa, have invented a new and useful Improvement in Self-Adding Lumber-Measuring Rules, of which the following is a specification:

My invention particularly relates to a means for ascertaining the dimensions of or number of square feet or inches contained in boards or pieces of lumber, and for measuring off a desired number of feet in length and width embracing one or more of such pieces.

In lumber-measuring instruments as heretofore constructed the motion imparted to the spur-wheel or toothed disk by traveling over the surface of the lumber has been transmitted from the shaft of said wheel or disk to an indicator turning on a pivot and indicating on a circular dial the measurement ascertained by the movement of the instrument over the lumber, and in such instruments it was necessary to adjust the mechanism to suit boards of different widths.

In my invention the motion of the spur-wheel or toothed disks is transmitted to an indicator which has a reciprocating rectilineal motion longitudinally of the carrying frame or case, and no adjustment is required for the purpose of measuring boards of different widths. Instead of a circular dial, I employ a scale marked with figures arranged in columns extending longitudinally on the surface of the carrying frame or case, and a separate column is provided for each of the different standard lengths of lumber.

Similar letters of reference indicate corresponding parts.

The accompanying drawing represents an instrument embodying my improvements, Figure 1 being a view of one side thereof. Fig. 2 is a view of the opposite side, partly in section; and Fig. 3 is a transverse section taken in the line $x\ x$ of Fig. 1.

The carrying frame or case is composed of a board or plate, A, with a scale marked on the opposite sides, and provided with guideways for the indicators to travel in, and a box or casing, B, inclosing the spur-wheel shaft and bevel-gearing. The box B is attached to one end of the board A, and at the other end is a handle, $a$, to facilitate holding the instrument in the hand. In the ends of the box B are bearings for the ends of a shaft, C, which carries two spur-wheels or toothed disks, D D. The shaft C lies in a plane parallel with the faces of the scale marked on the two sides of the board A, and in a direction transverse to the length of said board, so that the wheels D D will revolve in the direction of said length. To the shaft C is attached a bevel-gear wheel, E, which engages with a similar wheel, F, on one end of a shaft, G, working in a slot, $s$, in the board or plate A longitudinally thereof, and having its bearings in the ends of said slot. The shaft G is provided with a screw-thread extending the entire length of said shaft between said bearings.

On the two opposite faces of the board or plate A are two plates, H H, which lie over the slot $s$, and each has a slot which corresponds in length with said slot $s$, but is narrower, so as to project beyond the edges thereof, as shown in Fig. 3. These projecting edges form guideways for the indicator-slides, each of which consists of a block, I, with grooves on two opposite sides or edges for engagement with the projecting edges of the slot in the plate H. The slide I is provided with a spring or a thumb-screw, J, passing through a tap-hole in the slide, and engaging with the screw-thread on the shaft G. The slide I carries an indicator consisting of a pointer, K, attached to a pin or stud, $l$, projecting from the slide.

The figures of the scale marked on the board A are arranged in columns, and at the foot of each column is marked the letters "Ft." or the word "Feet," together with figures corresponding with certain standard lengths of lumber; and the figures in the columns indicate feet and fractions of feet, and each group of figures indicates the number of square inches in a certain number of square feet, either with or without a fraction of a foot. Thus, lumber is designated in the trade as "ten-foot boards," or "twelve-foot boards," or "fourteen-foot plank," according to the length in feet of the boards or planks of each standard class. The instrument here described is shown in the drawing as adapted to the measuring of lumber of five different lengths— namely, of ten, twelve, fourteen, sixteen, and eighteen feet; and it is of such dimensions and the parts are so arranged that it will measure a distance of twelve feet at one operation—that is to say, the spur-wheels, bevel-gearing, shafts, and indicators are so arranged with relation to each other that when the spur-wheels travel over a distance of twelve feet the indicators will show the number of square feet contained in said distance, according to the length of the board or plank, by indicating the sum, in square feet, of the number of feet in length multiplied by the number of feet in width.

The instrument constructed as above described is used as follows: The slides I I are placed at the ends of the guideways nearest the handle a, and the thumb-screws J J are screwed in so as to cause their points to engage with the threads of the shaft G. The instrument is then held by the handle a, with the side marked "No. 1" (see Fig. 1) uppermost, and it is placed with the wheels D D at one edge of a board and is propelled toward the other edge, sufficient pressure being brought to bear to cause the wheels to turn as they travel over the board.

The motion imparted to the wheel-shaft is transmitted by the gearing to the screw-shaft G, and the engagement of the screws J J with the thread of said shaft causes both of the slides I I and attached indicators K K to travel toward the other end of the slot. When the indicator on the first side reaches the end of the slot, the instrument is turned over laterally, so as to bring the side marked No. 2 (see Fig. 2) uppermost, and the forward movement of the instrument over the board is continued. This reverses the direction of rotation of the wheel-shaft, and consequently reverses the direction of travel of the slides and indicators, and causes them to travel back to the end of the slot from which they started, and to indicate the number of square feet embraced in the entire distance traveled by the instrument, as well as the number embraced between the starting-point and any given point between it and the terminal point. For example, if the board or plank traversed by the instrument is twelve feet long and twelve inches wide, the indicator K will point to the figure 12 in the twelve-foot column. If the board is eight inches wide and twelve feet long, the indicator will point to the figure 8 in the twelve-foot column, which is the number of square feet in a board of such dimensions. If the board is ten inches wide and sixteen feet long, the indicator will point to the figures $13\tfrac{1}{3}$ in the sixteen-foot column, which denotes that the width (ten inches) multiplied by the length (sixteen inches) is equal to thirteen feet and one-third of a foot, which is the area contained in a board of such width and length.

It will be perceived that the instrument may be used either transversely or lengthwise of the board, the figures on the scale indicating square inches in the one case and square feet in the other.

It is obvious that the instrument may be made of such dimensions as to enable it to traverse a greater distance than twelve feet at one operation; but as the second part of the operation carries the slides back to the starting-point, it is only necessary to turn the instrument alternately to the first and second positions in order to continue the operation indefinitely.

It is also obvious that the scale may be made to embrace every standard length known to the trade, and that no special adjustment is necessary in order to adapt the instrument to different lengths. If a measurement ends with the indicator at an intermediate point between the ends, the thumb-screw is disengaged from the thread, and the slide is moved back to the starting-point and the screw again engaged with the thread.

The number of square feet in a piece of lumber traversed by the instrument is readily ascertained by referring to the column corresponding with the length of the board.

The operation is as follows: The instrument is arranged on one end of a board and pushed longitudinally to the other end, the pointer or indicator having been placed at zero. By looking in the column that represents the width of the plank, the indicator will be found to point to the number of square feet; or, if the instrument is used transversely, by examining the column representing the length of the board or plank, the pointer will be found to indicate the number of square feet.

Having thus described my invention, what I claim as new, and desire to secure by Letters Patent, is—

The combination, with the slotted board A, rotated as described, of the shafts C G, having wheels D D E F, the slotted plates H, and the grooved indicator-slide I, as and for the purpose specified.

SETH KETHLEDGE.

Witnesses:
GEO. B. DUNBAR,
J. W. HOLLAND.